April 6, 1943.  J. M. AUZIN  2,315,576

SEALING OF SEAMED RUBBER ARTICLES

Filed July 25, 1940  2 Sheets—Sheet 1

INVENTOR
John M. Auzin
BY Nathaniel Frucht
ATTORNEY

April 6, 1943.   J. M. AUZIN   2,315,576
SEALING OF SEAMED RUBBER ARTICLES
Filed July 25, 1940   2 Sheets-Sheet 2

INVENTOR
John M. Auzin
BY Nathaniel Frucht
ATTORNEY

Patented Apr. 6, 1943

2,315,576

UNITED STATES PATENT OFFICE 2,315,576

SEALING OF SEAMED RUBBER ARTICLES

John M. Auzin, Warwick, R. I., assignor to Davol Rubber Company, a corporation of Rhode Island Application July 25, 1940, Serial No. 347,379

1 Claim. (Cl. 154—42)

My present invention relates to the manufacture of seamed rubber articles and has particular reference to a novel method and apparatus of making the same.

The principal object of the present invention is the construction of hollow rubber articles having smooth internal seams.

Another object of the present invention is to provide a novel method and apparatus for closing seams during the construction of hollow rubber articles.

A further object of the present invention is to provide a simple and economical method of closing the seams of a hollow rubber article without leaving a weak spot therein.

Other objects and advantageous features of the present invention will be readily apparent to a person skilled in the art.

With the above and other objects and advantageous features in view, my invention consists of a novel article and a novel method and apparatus for manufacture thereof, more fully disclosed in the detailed description following, in conjunction with the accompanying drawings, and more specifically defined in the claim appended thereto.

In the drawings, which show the invention as specifically applied to a blood pressure bag:

In the manufacture of seamed rubber articles made by the dipping method, a seam is formed at the opening where the form upon which the article has been dipped is withdrawn, this seam being normally sealed by subsequent dipping. However, it has been found that the seam has a tendency to close during the subsequent dipping operation, thus causing an uneven seam and possible weak spots in the finished article. To correct this difficulty, I have devised a novel apparatus and a novel method of manufacture of seamed rubber articles which finishes the seams smoothly and eliminates weakness in the completed seams.

While the present invention may be applied to any type of rubber article, for the purposes of illustration I have shown and described the invention as applied to a blood pressure bag used by physicians for measuring the blood pressure of a patient.

Figure 1:
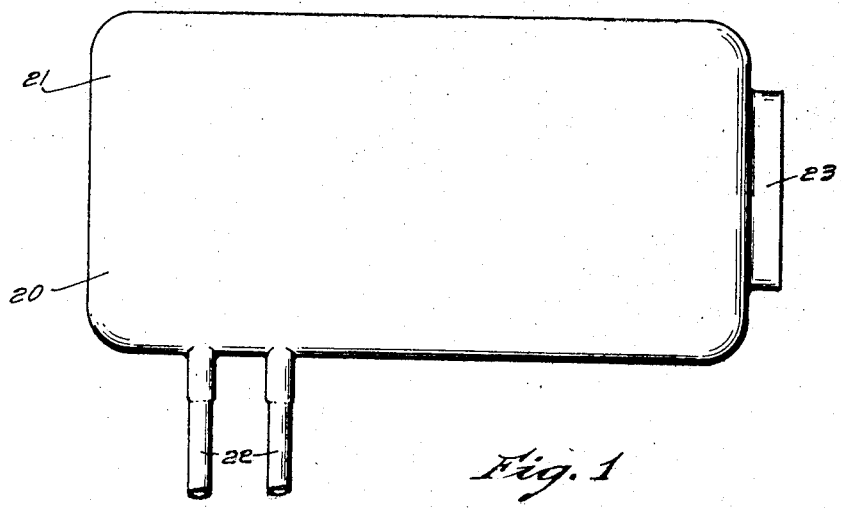
Fig. 1 is a plan view of the bag stripped from the dipping form.
Figure 2:
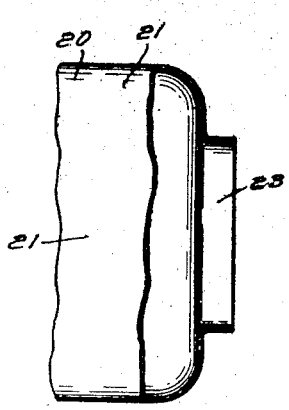
Fig. 2 is a fragmentary view of the end of the same, parts being broken away.
Figure 3:
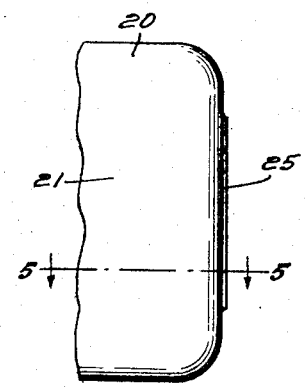
Fig. 3 is a view similar to Fig. 2, the edges of the opening being trimmed.
Figure 4:
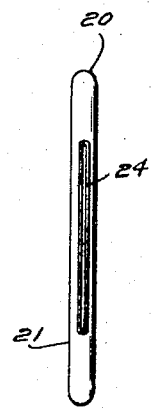
Fig. 4 is an end view of Fig. 3.
Figure 5:
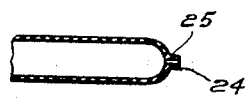
Fig. 5 is a section on line 5—5 of Fig. 3.

Referring to the drawings illustrating my invention, the bag 20 comprises a substantially rectangular hollow bag portion 21 having adjacent spaced air tubes 22 extending therefrom and integral therewith. As shown in Fig. 1, when the bag 20 is formed on an aluminum or other metal form by dipping, an opening flap 23 necessarily is formed at the opening through which the form is removed. When the dipping operation on the main body portion 21 on the bag is completed, the aluminum or other metal form is removed and the flap 23 is sheared off as shown in Figs. 3, 4 and 5, leaving a slit or opening 24 extending along one edge of the bag with a portion of the rubber 25 extending slightly outwardly to form a ridge or narrow flap.

Figure 6:
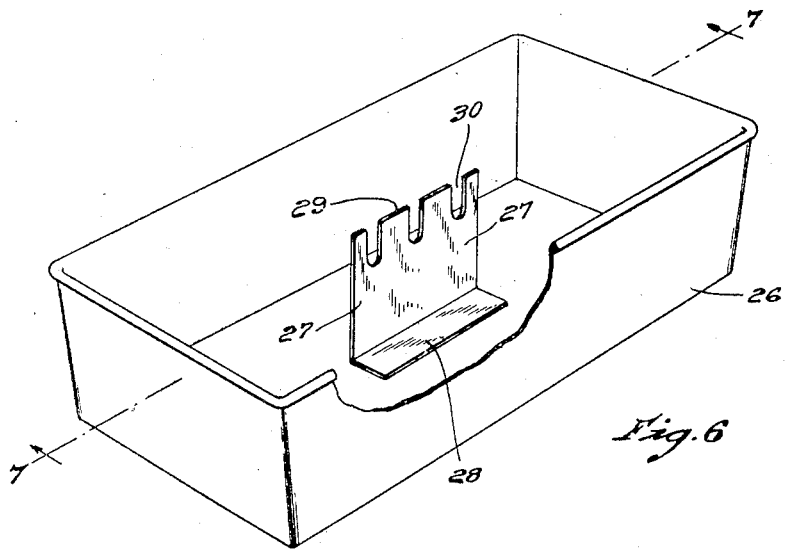
Fig. 6 is a perspective view of the dipping tank.
Figure 7:
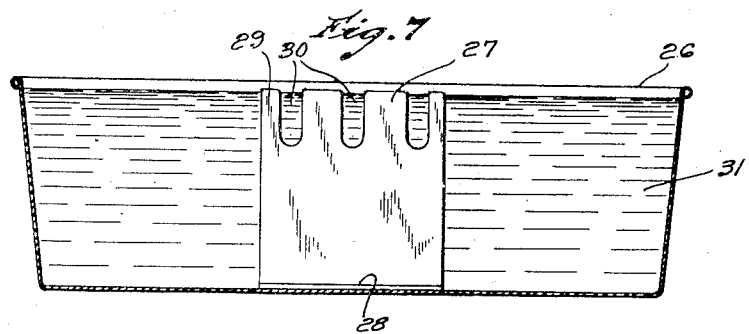
Fig. 7 is a section thereof taken on line 7—7 of Fig. 6.

If the bag 20 be dipped to close the opening 25, the natural resiliency of the rubber will tend to keep the slot 24 in closed position so that only a relatively thin coat of rubber is formed over the slot, and the interior of the seam will be rough and uneven. To overcome this difficulty, I provide a dipping tank 26, see Fig. 5, which may be of any desired material and of any desired shape, the tank having an upwardly extending L-shaped plate 27 mounted therein with its lower horizontal arm portion 28 riveted or soldered to the bottom of the tank 26. The upstanding portion 29 is provided with a plurality of elongated cutouts 30 extending from the upper edge of the plate 27 vertically partially downwardly towards the bottom of the tank. As illustrated in Fig. 6, liquid latex 31 is placed into the tank 26 with the upper level of the latex below the upper edge of the plate 27 so that the upper edge of the plate 27 will extend above the level of the latex, in full view of the operator. It is necessary to provide means to permit flow of latex to the interior of the seam, as the edges normally close against inward flow of latex, and the plate 27 is a preferred means for this purpose.

Figure 8:
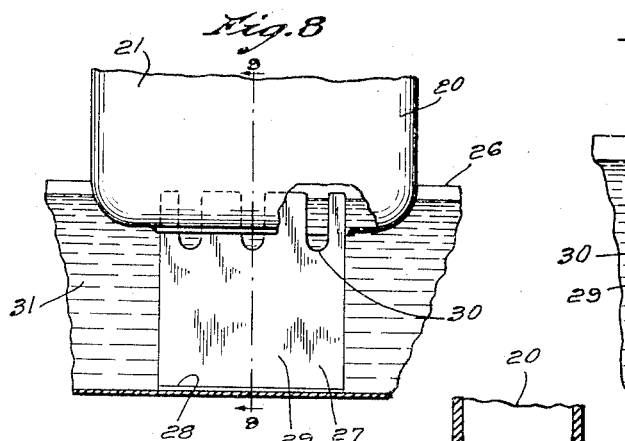
Fig. 8 is a detail view showing the bag being dipped in the dipping tank.
Figure 9:
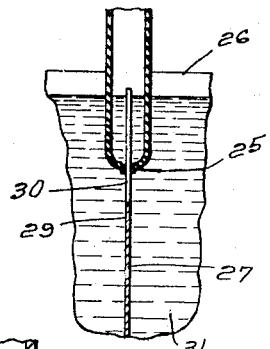
Fig. 9 is a section on line 9—9 of Fig. 8.
Figure 10:
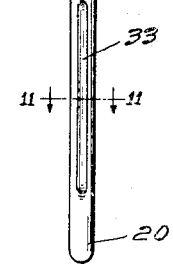
Fig. 10 is an end view of the closed seamed bag.

The dipping operation is then performed as follows: The operator holds the bag 20 with the slot 24 over the plate 27 and allows the bag 20 to slide over the top edge of the plate 27, as shown in Fig. 8. The bag is dipped downwardly into the latex 31 until the edge of the bag and the slot 24 are completely immersed. The bag may now be slightly shaken or twisted by the operator, the plate 27 holding the slot 24 open and permitting the latex to flow into the bag. The flow of the latex into the bag through the slot 24 is aided by the cut-out portions 30 in the plate 27, these cut-out portions insuring flow of latex within the bag.

Figure 11:
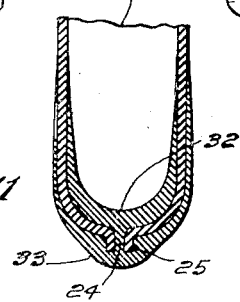
Fig. 11 is an enlarged section on line 10—10 of Fig. 9.

The bag 20 is now removed from the dipping tank and from the plate 27, the inherent resiliency of the rubber tending to close the slot 24. The latex inside the bag adheres to the inner surface of the slot 24, as illustrated at 32 in Fig. 11, and flows down by gravity to form an inner smooth seal at the lip 25 of the bag; the outer latex forms an outer coating 33, and the slot 24 is thus completely sealed. The sealing may be strengthened by further dipping in the latex to build up the outer coat 33.

The resultant bag is thus provided with a seam 24 which is completely smoothly sealed from the inside and the outside of the bag, with no weak point which may burst under the air pressure when the bag is in use.

I have therefore provided a novel dipping tank and a novel method of sealing the seam on a rubber article so that a combined inner and outer seal are provided to completely close the opening. The resultant seam is thus a smooth finished seam and a complete seal both on the inside and the outside provides a strong construction for insuring longer life to the bag. The above described procedure may be applied to the formation of finished seams for any hollow rubber article, by suitable changes in the apparatus used such as may readily be devised by any skilled mechanic.

While I have described a specific constructional embodiment of my invention and a specific method and apparatus, it is obvious that changes in the manner of forming the hollow article, in the materials used, in the arrangement of parts, and in the means for spreading the opening to be seamed and for supplying latex to the interior of the seam, may be made without departing from the spirit and the scope of the invention as defined in the appended claim.

I claim:

The method of forming a finished seam in hollow rubber articles having open seam edges, comprising the steps of dipping the open seam edges in rubber solution while holding the seam edges sufficiently distended to permit flow of rubber solution into and around the seam, and then withdrawing the edges from the rubber solution and permitting the open seam edges to close, whereby gravity flow of the rubber solution provides a smooth finish on both the interior and the exterior of the seam.

JOHN M. AUZIN.